United States Patent [19]

Wasserman

[11] Patent Number: 4,882,012
[45] Date of Patent: Nov. 21, 1989

[54] WATER DISTILLER

[76] Inventor: Kurt Wasserman, P.O. Box 77, Port Jervis, N.Y. 12771

[21] Appl. No.: 130,947

[22] Filed: Dec. 10, 1987

[51] Int. Cl.⁴ .............................................. B01D 3/00
[52] U.S. Cl. .................... 202/176; 122/508; 202/182; 202/185.3; 202/188; 202/195; 202/197; 202/200; 202/250; 203/10; 203/40
[58] Field of Search ............ 202/176, 180, 182, 250, 202/185.4, 182.3, 197, 195, 200, 188, 242, 266; 203/40, 10, 100, DIG. 17; 210/348; 55/185; 159/DIG. 28; 122/508

[56] References Cited

U.S. PATENT DOCUMENTS

| 36,403 | 9/1862 | Grannis | 202/185.3 |
|---|---|---|---|
| 216,841 | 6/1879 | Fox | 202/200 |
| 750,747 | 1/1904 | Young | 202/200 |
| 798,901 | 9/1905 | Hodges | 202/200 |
| 838,314 | 12/1906 | Fricke | 202/185.4 |
| 1,306,687 | 6/1919 | Doubleday | 202/190 |
| 2,848,389 | 8/1958 | Bjorksten | 203/10 |
| 2,924,557 | 2/1960 | De Furia | 202/176 |
| 3,351,538 | 11/1967 | Andrassy | 203/DIG. 1 |
| 3,397,117 | 8/1968 | Smith et al. | 202/234 |
| 3,549,503 | 12/1970 | Hay | 202/234 |
| 3,694,321 | 9/1972 | Marovich et al. | 202/200 |
| 3,870,605 | 3/1975 | Sakamoto | 202/234 |
| 4,010,080 | 3/1977 | Tsay et al. | 203/10 |
| 4,113,571 | 9/1978 | Nygards | 202/176 |
| 4,589,955 | 5/1986 | Nukala et al. | 202/180 |
| 4,633,680 | 1/1987 | Lang et al. | 62/507 |

FOREIGN PATENT DOCUMENTS

| 3015254 | 10/1981 | Fed. Rep. of Germany | 203/DIG. 1 |
|---|---|---|---|
| 0241693 | 12/1986 | Fed. Rep. of Germany | 159/49 |
| 2452302 | 11/1980 | France | 202/234 |
| 0010031 | 4/1978 | Japan | 202/234 |
| 1150964 | 4/1970 | U.S.S.R. | |
| 0735875 | 5/1980 | U.S.S.R. | 203/DIG. 1 |

Primary Examiner—Virginia Manoharan

[57] ABSTRACT

A water distiller includes an inner vessel in which source water is heated, an outer dome or housing on the inner surface of which the vapor from the inner vessel is condensed and a reservoir for receiving the condensate. The inner vessel includes a closure which directs vapor radially of the inner vessel to the dome or housing and which may include a vapor filtration element. A variety of domes or housings are shown including those of double wall construction with ports or vents to direct heat transfer fluid or air between the walls thereof, and those having lower portions which downwardly converge to direct the condensate to a central mouth of a reservoir.

23 Claims, 3 Drawing Sheets

WATER DISTILLER

BACKGROUND OF THE INVENTION

Water pollution is increasingly noted as a danger to health. While the use of bottled water has also increased, its use involves additional expense and inconvenience. Furthermore there is a general paucity of regulation and inconvenience. Furthermore there is a general paucity of regulation governing the purity and potability of bottled water. Home water purification provides a feasible alternative. Of the possible methods of home water purification, distillation appears to be preferable and provides additional benfits of the removal of inorganic materials, such as those which form calcerous deposits in the body.

For home use there is a need for a water distiller which is simple and inexpensive of construction, rugged, and efficient in its use of energy. While various home distillation devises are presently marketed, I believe increased efficiency and further simplicity leading to reduction in cost would cause greater market acceptance.

One of the simplest ways to produce a distiller is to boil source fluid in a vessel and allow the vapor to rise onto a dome above the vessel on the underside of which the vapor condenses. However the rising heat from the vessel heats the dome area impinged upon by the vapor cool enough to achieve condensation. Even when condensation is achieved, a significant amount of the condensate falls from the dome back into the open vessel. I have recognized that a means for directing the vapor radially of the inner vessel to the dome significantly improves the efficiency of such a design. I also make provision for filtration of the vapor and/or of the condensate to further purify the water product. Additionally, I propose herein simple and efficient means for cooling the dome and for collecting the condensate in a reservoir.

OBJECTS OF THE INVENTION

It is a general object of this invention to provide a water distiller which is simple in construction, inexpensive, efficient, easy to use, easy to assemble and easy to clean.

It is a more specific object of the invention to provide water distillation apparatus which includes an inner vessel for heating source water with means for directing the vapor radially to a condensing surface radially spaced from the vessel.

It is yet another object to provide efficient means for heating the source of water and efficient means for cooling the condensing surface.

It is still another object of the present invention to provide means for collecting and directing the condensate to a reservoir portion of the water distiller.

SUMMARY OF THE INVENTION

These and other objects are satisfied by my invention which generally comprises a dome means for condensing water vapor on an interior surface and a generally cylindrical vessel under the center of and radially within the dome means adapted to be filled with source water. A heater in the vessel heats the source water to a boil to drive off vapor to the upper end of the vessel. At the upper end of the vessel is a cylindrical closure, such as a porour filter, which not only removes particulates from the vapor but is also configured to direct vapor radially of the vessel to the dome. This is achieved by a non-porous disc which seals off the top face of the filter, thereby allowing outflow of vapor only radially from the filter. The vapor is thereby radially dispersed to a reduced area density as it impinges upon the inner surface of the dome. As a result the dome may be retained relatively cool without additional cooling means.

Th dome may be made of double walled construction and configured with ports or vents to allow heat transfer fluid flow or air flow between the walls. Where water is used as a heat transfer fluid for cooling the dome, a conduit may be provided between the dome and the vessel for keeping the vessel full of source water. The dome may be configured to use air flow between the walls by taking advantage of a chimney effect.

Furthermor, a variety of designs of reservoirs for the distilled water are possibl. In one simple design a removable reservoir may be the base of the water distiller. In this case the dome includes a lower portion which downwardly converges to catch and direct the condensate to a central mouth of the reservoir.

BRIEF DESCRIPTION OF THE DRAWING

Other objects, features and advantages of the invention will become apparent when reading the detailed description of the invention to follow in conjunction with perusal of the drawing in which.

DETAILED DESCRIPTION OF THE PREFERRED EMBODIMENTS

Figure 1:
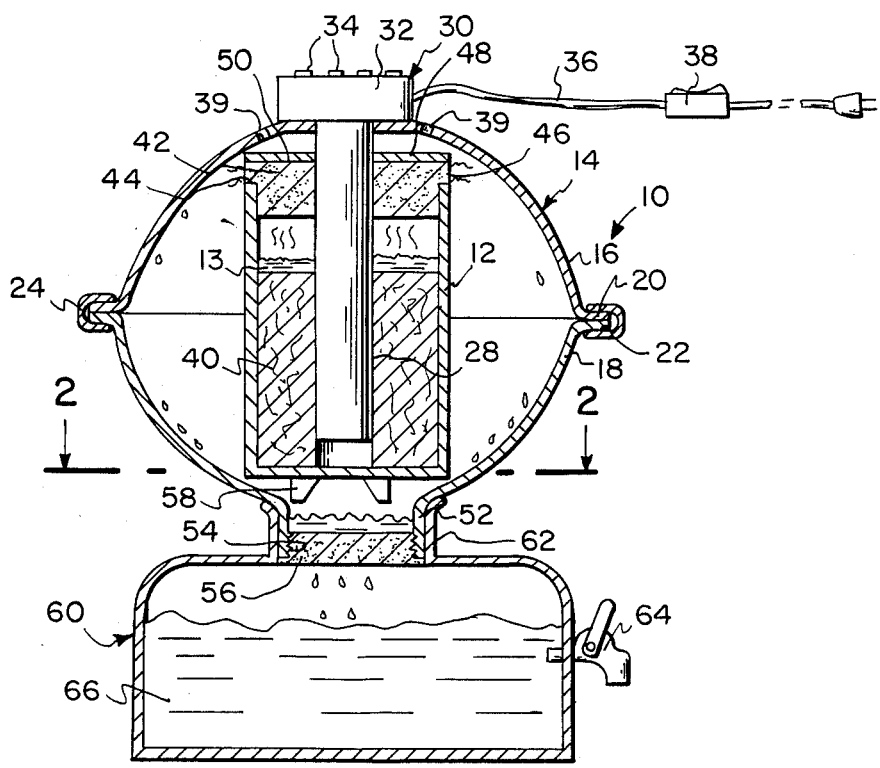
FIG. 1 is a cross-sectional elevation view of a first embodiment of the water distiller of the present invention.

My invention is most easily understood by separately describing each of the preferred embodiments. Referring first to the embodiment detailed in FIGS. 1 and 2 of the drawing, the first embodiment water distiller 10 comprises an inner cylindrical vessel 12 for source water 13, (made of suitable material to be heated and easily cleaned, such as stainless steel, ceramic or glass) within a generally spherically shaped housing 14. Housing 14 includes an upper downwardly diverging dome 16 and a lower downwardly converging portion 18 hereafter termed a collector. Dome 16 and collector 18, are also preferably of stainless steel, glass or ceramic but may be constructed of thermally resistant plastic. The dome 16 and collector 18 have opposed annular flanges 20, 22 which are maintained in abutting relationship by a suitable removable circular band or clamp 24.

The dome 16 includes a central hole at the top through which is removably downwardly and axially inserted the circular shaft 28 of a thermostatically controlled electric heater 30. Heater 30 includes a generally circular control head portion 32 having signal lights 34 indicating when said heater is on. The head portion 32 rests on top of dome 16 and includes a power cord 36 and on/off switch 38 carried by cord 36. Within shaft 28 is a resistance heating element and thermostat (not shown) which maintains the lower end of shaft 28 at a temperature to boil water 13. Suitable sensors may also be provided on shaft 28 to turn off the heater when the amount of source water 13 is insufficient. Dome 16 also has a plurality of vent holes 39 to relieve the vapor pressure within housing 14.

Vessel 12 further contains a removable annular slug 40 of porous material for the purpose of baffling or diffusing turbulence within the boiling source water 13. One approach for configuration of slug 40 is a tightly rolled stainless steel screen as taught in U.S. Pat. No. 4,113,571 to Nygards. I have found a removable and replaceable slug 40 made of stainless steel wool is most useful for turbulence reduction and also for collecting the lime and other deposits which precipitate from the source water 13. When the slug 40 becomes substantially clogged it may be discarded and replaced.

The mouth of vessel 12 is closed by a generally annular porous filter 42 as of porous ceramic or charcoal for removing from the vapor produced from boiling of source water 13. Filter 42 includes an external radial step 44 resting on the mouth of vessel 12 which allows the portion below the step to seat with a tight sliding fit within the interior of the mouth of vessel 12 and the portion above the step to have an exposed cylindrical exterior surface 46 above the vessel. Further, an annular metal disk 48, is adhered to the top surface of filter 42 to prevent water vapor from the vessel from escaping from the top surface 50 of filter 42. The filter 42 and disc 48 have their central holes sized to provide a close sliding fit on heater shaft 28 to allow the heater 30 to be removed from the balance of distiller 10.

The collector 18 has at its lower end a downwardly directed cylindrical mouth 52 having internal threads 54 in which is screwed a suitable additional filter 56 as of activated charcoal. Above mouth 52, collector 18 has integral radially inwardly directed lands or bosses 58 which support vessel 12 spaced above mouth 52.

The base of distiller 10 is a removable bottle or reservoir 60 having the central upstanding cylindrical mouth 62 which fits slideably around the mouth 52 of collector 18. The bottle 60 may also have a spigot 64 for output of the distilled water 66 collected in bottle 60. Bottle 60 may be of any suitable material which is easily cleaned and is preferably translucent or transparent to allow gauging the level of distillate 66. If no spigot 64 is provided, the bottle 60 may be removed from the distiller 10 and the distilled water may be poured from mouth 62 into a suitable container.

It should now be apparent how this first embodiment of the invention operates. First, the distiller is assembled as shown after the vessel 12 has been filled with a suitable amount of source liquid 13. The source water is brought to a boil by the operative shaft 28 of electric heater 30. Vapor therefrom rises into the porous filter 42 and exits the cylindrical face 46 which directs the vapor radially of the vessel and substantially horizontally to dome 16 of housing 14. Since the vapor is directed radially outward its density is decreased as it reaches the interior surface of dome 16. The relatively large exterior surface of dome 16 is sufficiently cooled by ambient air to condense the vapor on the interior surface of dome 16. The condensate runs downward along the interior surface of dome 16 until it drops or runs to collector 18. The condensate continues to run downward and radially inward along the inner surface of collector 18 until it reaches mouth 52. At this point the condensate falls through mouth 52 where it collects on top of and slowly passes through filter 56 into bottle 60.

Figure 3:
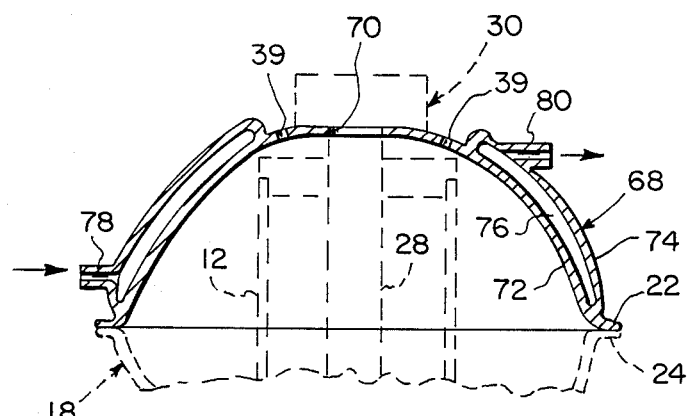
FIG. 3 is a cross-sectional elevation view of an alternate top portion for the water distiller in FIG. 2.

As stated with respect to the first embodiment, ambient air is relied upon to sufficiently cool dome 16. FIG. 3 illustrates an alternative dome 68, preferably of stainless steel, which replaces dome 16 in FIG. 1. Dome 68 has the central hole 70 for acceptance of shaft 28 of electric heater 30 and includes vent holes 39 proximate hole 70. Dome 68 also has annular flange 22 for resting on the flange 24 of collector 18. Below vent holes 39, the dome 68 is of double wall construction including the inner wall 72 and outer wall 74 forming therebetween a pocket 76. There are two diametrically opposed tubular ports 78 and 80 for directing heat transfer fluid, such as water, through space 76 for the purpose of cooling inner wall 72. In order to cause fluid flow throughout pocket 76, one of the ports 78 is near the bottom of dome 68, while the other port 80 is proximate the top of dome 68. Thus port 78 need only be connected via a hose (not shown) to a source of cool water or other suitable heat transfer fluid while port 80 need be connected via a suitable hose either to a drain or in a manner to permit recirculation of the heat transfer fluid.

Figure 4:
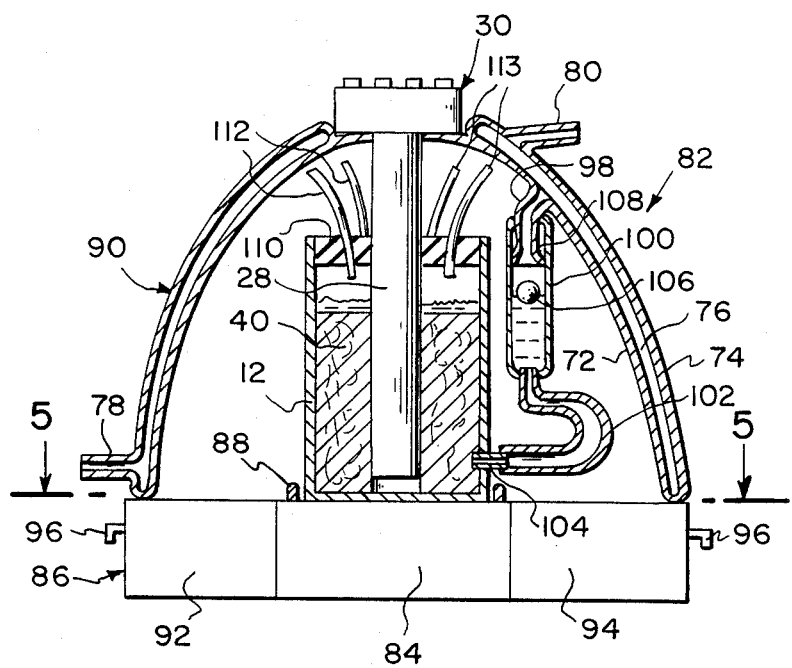
FIG. 4 is a cross-sectional elevation view of another embodiment of the water distiller of the present invention.
Figure 5:
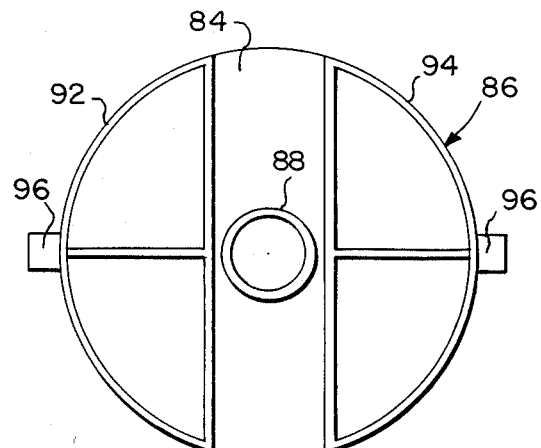
FIG. 5 is a plan view of ht base portion of the water distiller in FIG. 4 as would be seen by taking a section throug the lines 5—5 in FIG. 4.

In the distiller embodiment 82 illustrated in FIGS. 4 and 5 several variations are shown. Therein, the vessel 12 rests on the elongated diametral fixed portion of a circular base 86 and in particular within a raised circular rib 88 thereon. There is no collector element, and instead, the double-walled dome 90 rests directly on base 86. Base 86 also has two open drawer-like removable reservoirs 92 and 94 on opposite sides of diametral fixed portion 84. Each of reservoirs 92, 94 has a handle 96 to enable removal of the reservoir from base 86.

Dome 90 has inner wall 72 and outer wall 74 defining the space 76 therebetween as well as the fluid inlet port 78 and the diametrically opposed fluid outlet port 80. In this embodiment not only is dome 90 cooled by the flow of cool water through the space 76 but the dome has an additional outlet port 98 provided intermediate the top and bottom of dome 90 and nearer the upper portion of the inner side of dome 90, which is coupled to vessel 12 by a suitable water level controlling device 100 and conduit 102 to a port 104 in the lower sidewall of vessel 12. Water level controlling device 100 may be a simple ball float 106 which will seal against downwardly directed orifice 108 when the water level reaches the predetermined level to be maintained, cutting off further fluid flow through device 100.

The embodiment of FIGS. 4 and 5 also differs with rspect to the closure of vessel 12. Therein, the mouth of vessel 12 is sealed with a non-porous sylindrical stopper 110. Stopper 110 has several holes through which are sealably inserted a plurality of metal tubes 112 which are bent radially. The vapor emanating from vessel 12 passes solely through tubes 112 and out the top ends 113 thereof. The tubes 112 are bent and directed angularly to concentrate the vapor emanating from vessel 12 to be substantially directly above the open reservoirs 92, 94 but not directly above the base portion 84. The tubes 112 comprise means for directing the vapor from vessel 12 radially of the vessel. This vapor is condensed on the inside wall 72 of dome 90. The condensate runs down the interior surface of inside dome wall 72 and then drops into the open reservoirs 92, 94.

Although now shown, the central portion 84 of base 86 can be inclined to direct condensate which falls thereon into either of the reservoirs 92, 96.

Figure 2:
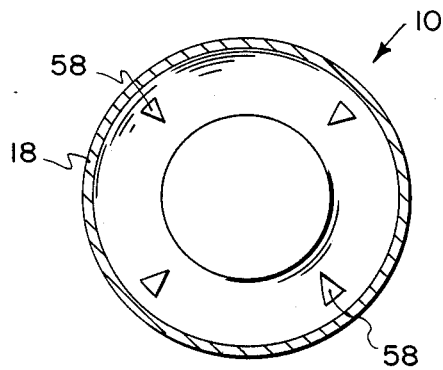
FIG. 2 is a partial cross-sectional plan view of the water distiller taken through the lines 2—2 in FIG. 1.
Figure 6:
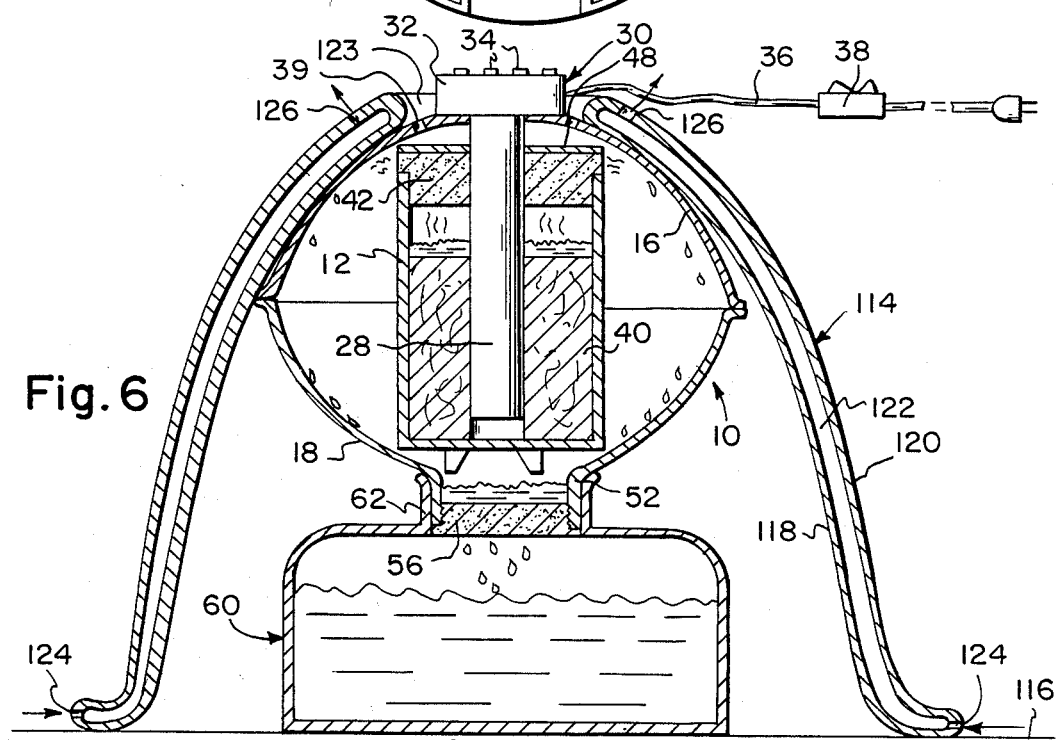
FIG. 6 is a cross-sectional elevational view of yet another embodiment of the water distiller.

The embodiment of FIG. 6 shows a water distiller 10, substantially the same as in FIG. 1 but with the addition of a second generally parabolic double-walled dome 114 which rests at its top in substantial surface contact with the exterior of dome 16 of distiller 10 and at its bottom on the same support surface 116 on which base 60 rests. Dome 114 is preferably of stainless steel and includes the inner wall 118 and outer wall 120 defining the space 122 therebetween. A central hole 123 in the top of dome 114, permits the positioning of dome 114 with the head 32 of electric heater 30 in hole 123. The bottom portion of the dome 114 has, spaced slightly above surface 116, a plurality of angularly spaced apart radially facing vent holes 124 for air intake into space 122. There are also a plurality of radially outwardly facing, angularly spaced apart vent holes 126 in outer wall 120 proximate hole 123 for exhaust of air from space 122. The upward air flow through bottom vent holes 124 into space 122 and out of top vent holes 126 is driven by a chimney effect caused by the heating of the top portion of dome 114 in contact with dome 116. The air flow cools the inner wall 118 of dome 114 and the portion of dome 16 whichis in surface contact therewith.

Figure 7:
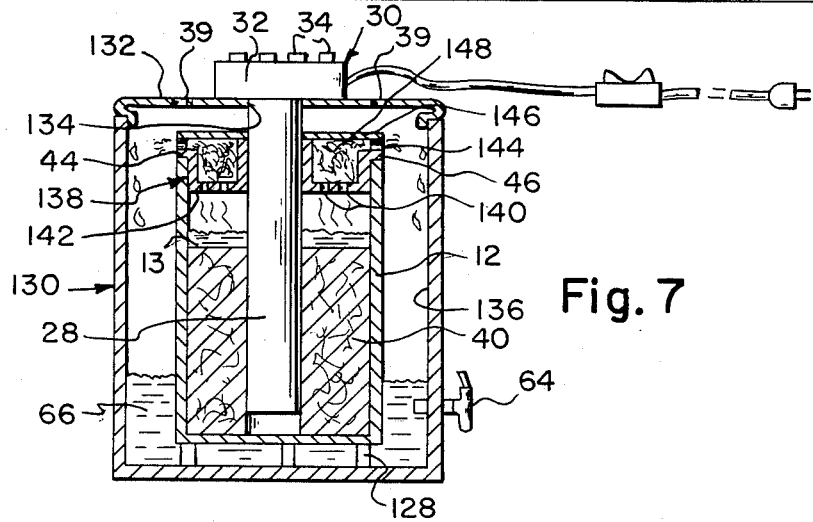
FIG. 7 is a cross-sectional elevational view of still another embodiment of the water distiller of the present invention.

Another embodiment of the present invention is illustrated in FIG. 7 of the drawing. Therein the inner vessel 12 rests on legs 128 within the center of an outer cylindrical vessel 130 as of stainless steel. The inner sidewalls of vessel 130, together with a cover 132 on vessel 130, function as a dome. Cover 132 has pressure relief vent holes 39 and a central hole 134 through which the shaft 28 of heater 30 passes. The heater 30 and cover 132 may be fixedly attached to each other since the lifting of the cover will also extract the heater shaft 28 from vessel 12.

This embodiment also differs from those previously detailed with regard to the closure of vessel 12. The closure comprises a generally annular cup 138, as of metal, which has the radial step 44 in its sidewall to rest on the mouth of vessel 12. The portion of the sidewall of cup 138, below step 44 is sized for a tight sliding fit within the interior of the mouth of vessel 12. Cup 138 has vertically directed relatively small holes 140 in its planar bottom wall 142 and radially directed holes 144 in the cylindrical surface 46 of its sidewall above step 44. Cup 138 also has a tight fitting non-porous annular flat cover 146, as of metal, over its top. The cup 138 and cove 146 form a chamber for holding nuggets or flakes of vapor filter material 148 such as charcoal or ion exchange resins which filter the vapor from the boiled source water 13 as the same passes through cup 138 via holes 140 and 144. As vapor leaves surface 46 radially it reaches the upper portion of the cyclindrical interior sidewall 136 of vessel 130. The vapor condenses on the sidewall 136 and the resultant condensate runs down to where it is collected at the bottom of vessel 130. A spigot 64 is advantageously located on said sidewall 136 at the lower portion of vessel 130 to deliver collected condensate 66 from the bottom of vessel 130. It should be recognized that the dome of previously explained embodiments is replaced in this embodiment by the combination of the cover 132 and sidewall 136 of vessel 130 which may broadly be considered a dome means. Similarly the reservoir of the previous embodiments is replaced by the bottom portion of vessel 130.

It should also be apparent that the objects of the invention have been achieved and may be achieved within the intended spirit and scope of the invention by numerous modifications, additions and omissions in the embodiments detailed herein.

What is claimed is:

1. Apparatus for distilling water comprising:
   (a) a dome means for condensing water vapor on its interior surface;
   (b) an inner cylindrical vessel under the center of said dome means for containing said water, said vessel having an opening at its upper end;
   (c) heating means for boiling said water in said vessel to thereby drive water vapor to the opening of said vessel;
   (d) means at the opening of said vessel for directing the water vapor radially of said vessel and toward the interior surface of said dome means, wherein said means comprises a cylindrical filtration means for removing particulates from said water vapor including a cylindrical sidewall upstanding from the opening of said vessel and means for sealing the top of said filtration means for directing outflow of water vapor through said cylindrical sidewall; and
   (e) means under said vessel for catching a condensate which runs off the interior surface of said dome means.

2. The apparatus of claim 1 wherein said condensate catching means comprises a downwardly converging member below and supporting said vessel and supporting said dome means, for directing the condensate caught to the center of said member..

3. The apparatus of claim 2 wherein the center of said downwardly converging member is open and said condensate catching means further comprising a removable container for condensate positiond below the center of said downwardly converging member and supporting said member, the top of said container being open for receiving condensate from the center of said downwardly converging member.

4. The apparatus of claim 1 further comprising a circular base member, including a fixed portion for supporting said dome and said vessel, and two removable opposed open containers on opposite sides of said fixed portion for catching condensate running off the underside of said dome.

5. The apparatus of claim 1 wherein said dome means comprises a double-walled hollow member having input and output port means for establishing a flow of heat transfer fluid between the walls of said hollow member for cooling said dome means.

6. The apparatus of claim 5 wherein said vessel has a water filling inlet and wherein said heat transfer fluid comprises water and wherein said input and output port means comprise an input water port means proximate the bottom of said dome means and an output water port means proximate the top of said dome means, and further comprising an additional output water port means carried by said dome means intermediate the top and bottom of said dome means and conduit means coupled between said additional output water port means and said water filling inlet for conveying water preheated in said dome means to the vessel.

7. The apparatus of claim 5 wherein said heat transfer fluid comprises ambient air, and wherein said input and output port means comprise input air vent means proximate the bottom of said dome means and output air vent means proximate the top of said dome means.

8. The apparatus of claim 2 wherein said dome means comprises a double-walled hollow member having input and output port means for establishing a flow of heat transfer fluid between the walls of said hollow member for cooling said dome means.

9. The apparatus of claim 8 wherein said vessel has a water filling inlet and wherein said heat transfer fluid comprises water and wherein said input and output port means comprise an input water port means proximate the bottom of said dome means and an output water port means proximate the top of said dome means, and further comprising an additional output water port means carried by said dome means intermediate the top and bottom of said dome means and conduit means coupled between said fluid outlet an additional output water port means and said water filling inlet for conveying water preheated in said dome means to the vessel.

10. The apparatus of claim 8 wherein said heat transfer fluid comprises ambient air, and wherein said input and output port means comprise input air vent means proximate the bottom of said dome means and output air vent means proximate the top of said dome means.

11. The apparatus of claim 3 wherein said dome means comprises a double-walled hollow member having input and output port means for establishing a flow of heat transfer fluid between the walls of said hollow member for cooling said dome means.

12. The apparatus of claim 11 wherein said vessel has a water filling inlet and wherein said heat transfer fluid comprises water and wherein said input and output port means comprise an input water port means proximate the bottom of said dome means and an output water port means proximate the top of said dome means, and further comprising an additional output water port means carried by said dome means intermediate the top and bottom of said dome means and conduit means coupled between said additional output water port means and said water filling inlet for conveying water preheated in said dome means to the vessel.

13. The apparatus of claim 11 wherein said heat transfer fluid comprises ambient air, and wherein said input and output port means comprise input air vent means proximate the bottom of said dome means and output air vent means proximate the top of said dome means.

14. The apparatus of claim 4 wherein said dome means comprises a double-walled hollow member having input and output port means for establishing a flow of heat transfer fluid between the walls of said hollow member for cooling said dome means.

15. The apparatus of claim 14 wherein said vessel has a water filling inlet and wherein said heat transfer fluid comprises water and wherein said input and output port means comprise an input water port means proximate the bottom of said dome means and an output water port means proximate the top of said dome means, and further comprising an additional output water port means carried by said dome means intermediate the top and bottom of said dome means and conduit means coupled between said third port and said water filling inlet for conveying water preheated in said dome means to the vessel.

16. The apparatus of claim 14 wherein said heat transfer fluid comprises ambient air, and wherein said input and output port means comprise input air vent means proximate the bottom of said dome means and output air vent means proximate the top of said dome means.

17. The apparatus of claim 1, wherein said vessel is a first vessel, and wherein said dome means and said means under the first vessel for catching condensate together comprised a second cylindrical vessel within which said first vessel is substantially coaxially positioned, the sidewalls of said second vessel being radially outwardly spaced from said first vessel, and means for covering the top of the second vessel.

18. Apparatus for distilling water comprising:
(a) dome means for condensing water vapor on its interior surface;
(b) a vessel under said dome means for containing said water;
(c) a passage means for permitting removal of the water vapor from said vessel;
(d) heating means for boiling said water in said vessel to thereby drive water vapor from said vessel via said passage means toward the interior surface of said dome means; and
(e) mans under said vessel for catching a condensate which runs off the dome means, said condensate catching means comprising a downwardly converging member below said vessel and supporting said vessel and supporting said dome means, for directing the condensate caught to the center of said member.

19. The apparatus of claim 18 wherein said dome means comprises a double-walled hollow member having input and output port means for establishing a flow of heat transfer fluid between the walls of said hollow member for cooling said dome means.

20. The apparatus of claim 18 wherein the center of said downwardly converging member is open and said condensate catching means further comprising a removable container for the condensate positioned below the center of said downwardly converging member and supporting said member, the top of said container being open for receiving condensate from the center of said downwardly converging member.

21. The apparatus of claim 18 further comprising a circular base member, including a fixed portion for supporting said dome and said vessel, and two removable opposed open containers on opposite sides of said fixed portion for catching the condensate running off the underside of said dome.

22. The apparatus of claim 20 wherein said dome means comprises a double-walled hollow member having input and output port means for establishing a flow of heat transfer fluid between the walls of said hollow member for cooling said dome means.

23. The apparatus of claim 21 wherein said dome means comprises a double-walled hollow member having input and output port means for establishing a flow of heat transfer fluid between the walls of said hollow member for cooling said dome means.

* * * * *